(12) United States Patent
Lee et al.

(10) Patent No.: US 11,172,348 B2
(45) Date of Patent: Nov. 9, 2021

(54) APPARATUS AND METHOD FOR CONTROLLING SIGNAL RELATED TO EXTERNAL DEVICE

(71) Applicant: Samsung Electronics Co., Ltd., Suwon-si (KR)

(72) Inventors: Jaeyoung Lee, Suwon-si (KR); Jonghyun Ryu, Suwon-si (KR); Hyunjin Kim, Suwon-si (KR); Seunghwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/749,388

(22) Filed: Jan. 22, 2020

(65) Prior Publication Data

US 2020/0275252 A1    Aug. 27, 2020

(30) Foreign Application Priority Data

Feb. 22, 2019   (KR) .......................... 10-2019-0020944

(51) Int. Cl.
*H04W 8/00* (2009.01)
*H04W 4/80* (2018.01)
*H04W 48/10* (2009.01)
*H04B 11/00* (2006.01)
*H04W 60/04* (2009.01)

(52) U.S. Cl.
CPC ............ *H04W 8/005* (2013.01); *H04B 11/00* (2013.01); *H04W 4/80* (2018.02); *H04W 48/10* (2013.01); *H04W 60/04* (2013.01)

(58) Field of Classification Search
CPC ....... H04W 8/005; H04W 4/80; H04W 60/04; H04W 48/10; H04B 11/00
See application file for complete search history.

(56) References Cited

U.S. PATENT DOCUMENTS

| | | | |
|---|---|---|---|
| 9,867,050 B1 * | 1/2018 | Kamini | ............... H04W 12/084 |
| 10,172,002 B2 * | 1/2019 | He | ............... H04W 12/082 |
| 10,506,642 B2 | 12/2019 | Minatel et al. | |
| 10,880,683 B2 | 12/2020 | Wang et al. | |

(Continued)

FOREIGN PATENT DOCUMENTS

| | | | |
|---|---|---|---|
| EP | 3 097 743 B1 | | 1/2019 |
| EP | 3097 743 B1 * | | 1/2019 |

(Continued)

OTHER PUBLICATIONS

International Search Report and written opinion dated May 1, 2020, issued in International Application No. PCT/KR2020/001070.

*Primary Examiner* — Ankur Jain
*Assistant Examiner* — Angelica M Perez
(74) *Attorney, Agent, or Firm* — Jefferson IP Law, LLP

(57) ABSTRACT

A method for controlling a signal related to an external device and an electronic device therefor are provided. The electronic device includes a transceiver, a memory, and at least one processor. The at least one processor is configured to control to receive a broadcasted request signal for registering an external device, from the external device via the transceiver, identify whether a nonaudible frequency signal is received from the external device, and provide a message for registering the external device based on the nonaudible frequency signal being received.

12 Claims, 9 Drawing Sheets

(56) References Cited

U.S. PATENT DOCUMENTS

| | | | |
|---|---|---|---|
| 2005/0075107 A1* | 4/2005 | Wang | H04W 60/02 455/435.1 |
| 2014/0146727 A1* | 5/2014 | Segev | H04W 52/0229 370/311 |
| 2015/0207794 A1 | 7/2015 | Lee et al. | |
| 2015/0327045 A1* | 11/2015 | Chang | H04L 27/2656 370/329 |
| 2017/0202039 A1 | 7/2017 | Logue et al. | |
| 2018/0357022 A1 | 12/2018 | Darcius et al. | |

FOREIGN PATENT DOCUMENTS

| | | | |
|---|---|---|---|
| KR | 10-2016-0057774 A | | 5/2016 |
| KR | 1020160057774 | * | 5/2016 |
| KR | 10-2018-0136025 A | | 12/2018 |
| WO | 2016/167723 A1 | | 10/2016 |

\* cited by examiner (510)

(520)

APPARATUS AND METHOD FOR CONTROLLING SIGNAL RELATED TO EXTERNAL DEVICE

CROSS-REFERENCE TO RELATED APPLICATION(S)

This application is based on and claims priority under 35 U.S.C. § 119 of a Korean patent application number 10-2019-0020944, filed on Feb. 22, 2019, in the Korean Intellectual Property Office, the disclosure of which is incorporated by reference herein in its entirety.

BACKGROUND

1. Field

The disclosure relates to a method and apparatus for controlling a signal related to an external device.

2. Description of Related Art

Recently, with the development of digital technologies, various types of electronic devices are being widely utilized, such as, mobile communication terminals, personal digital assistants (PDA), electronic organizers, smart phones, tablet personal computers (PC), wearable devices, and the like. Further, hardware parts and/or software parts of an electronic device have been continuously improved in order to support and increase the functions thereof.

The Internet of things (IoT) is a technology that connects to the Internet using various things, which are equipped with sensors and have a communication function. Here, the things may indicate various devices which may contain sensors and a communication function, such as electronic devices, home appliance (e.g., a refrigerator, a washing machine, a sound device, or a gaming device), or medical devices (e.g., a blood sugar meter or a heart rate meter). Things that are connected via the Internet may provide information, which they learn by analyzing data exchanged therebetween, to a user, or enable a user to remotely control the things. The IoT is provided as a smart home service, so that a user may check or control the condition of a house, from a place away from the house, using an electronic device.

An external device may periodically broadcast a Bluetooth low energy (BLE) signal for connection to a neighboring device (e.g., an electronic device). If an electronic device receives a BLE signal, the electronic device may output a setup message for registering an external device. The setup message is automatically output from any device that receives a BLE signal, and the setup message may be provided at a time that the user does not desire, or from a device that the user does not desire.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for providing a message for external device registration only when a broadcasted request signal and a nonaudible frequency signal are received from an external device.

Additional aspects will be set forth in part in the description which follows and, in part, will be apparent from the description, or may be learned by practice of the presented embodiments.

In accordance with an aspect of the disclosure, an electronic device is provided. The electronic device includes a transceiver, a memory, and at least one processor. The at least one processor is configured to receive a broadcasted request signal for registering an external device, from the external device via the transceiver, identify whether a nonaudible frequency signal is received from the external device, and provide a message for registering the external device based on the nonaudible frequency signal being received.

In accordance with another aspect of the disclosure, an operation method of an electronic device is provided. The operation method includes storing device information corresponding to another electronic device in a memory of the electronic device, detecting an event related to registration of an external device, determining another electronic device, based on the device information, and instructing the determined other electronic device to register an external device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
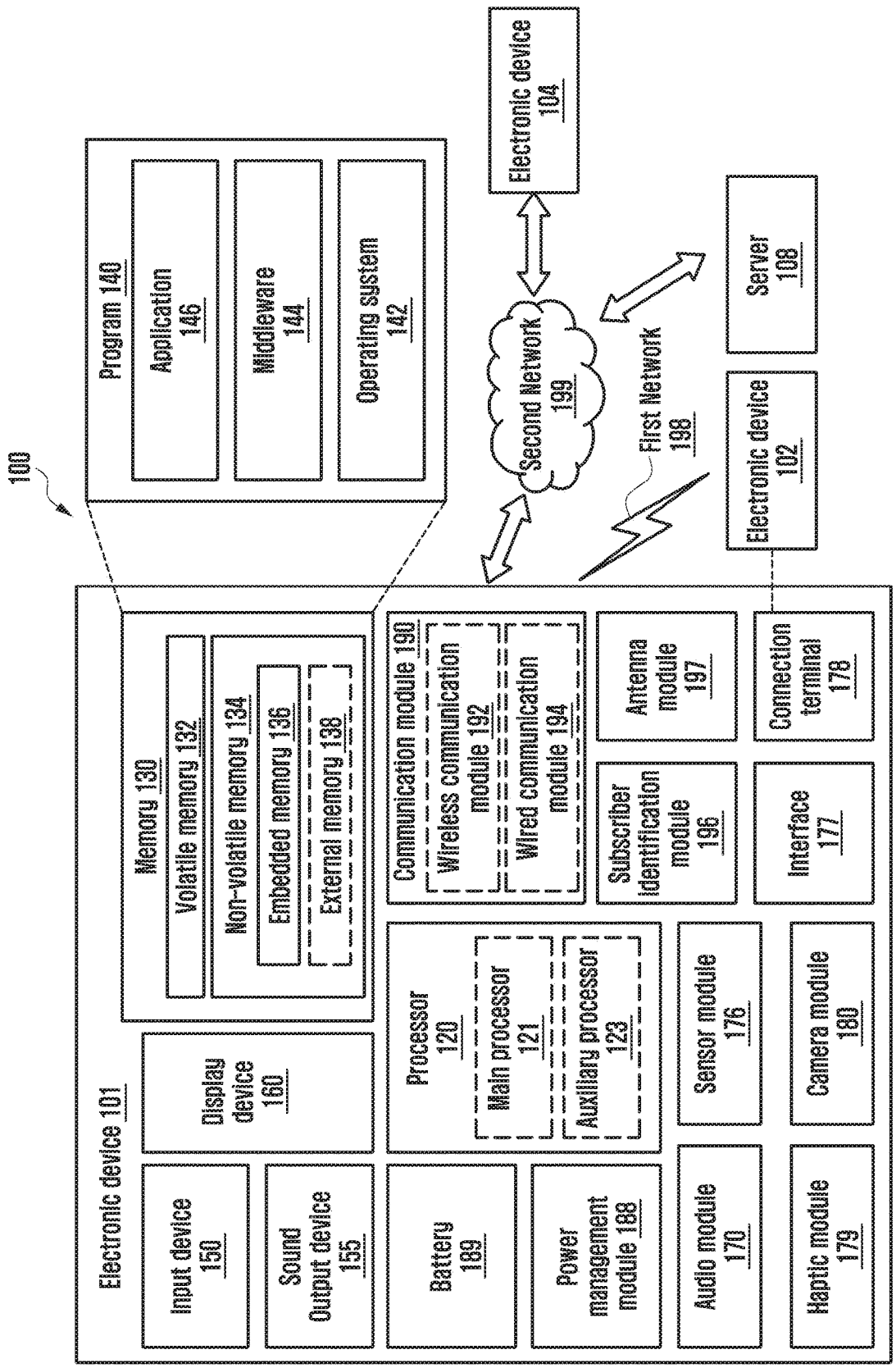
FIG. 1 is a block diagram of an electronic device 101 in a network environment 100 according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
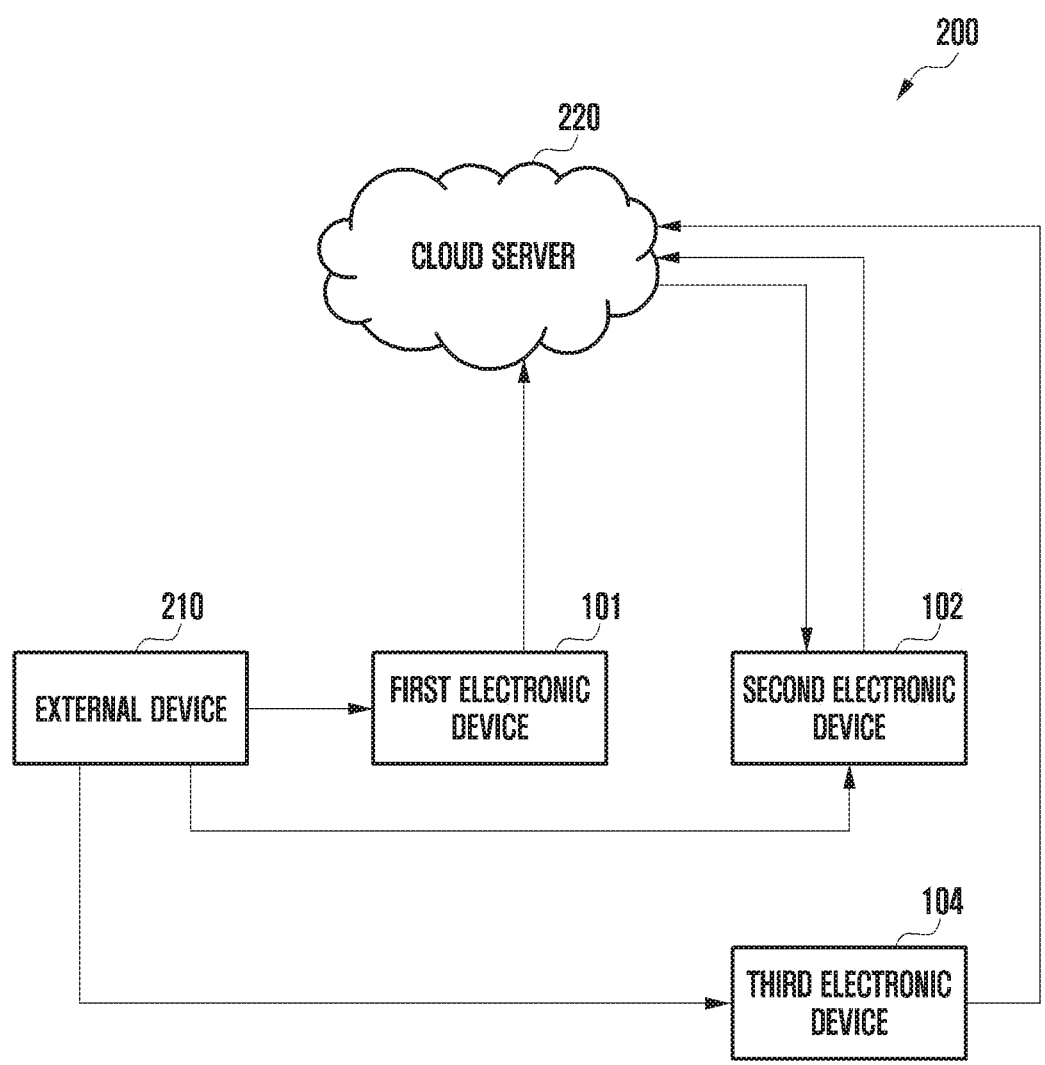
FIG. 2A is a diagram illustrating a configuration of a signal control system 200 including a server and a device according to various embodiments of the disclosure.

FIG. 2A is a diagram illustrating a configuration of a signal control system 200 including a server and a device according to various embodiments of the disclosure.

Referring to FIG. 2A, the signal control system 200 according to various embodiments may include an external device 210, a cloud server 220, the first electronic device 101, the second electronic device 102, or the third electronic device 104. The external device 210 may be a new device that is not registered with the first electronic device 101 to the third electronic device 104. The first electronic device 101 to the third electronic device 104 may be a hub device (e.g., an artificial intelligence (AI) speaker, a television (TV), or the like) or an electronic device (e.g., a smart phone) of an occupant within a predetermined space (e.g., a house or an office).

The cloud server 220 (e.g., the server 108 of FIG. 1) according to various embodiments may perform control so that the external device 210 is registered with at least one of the first electronic device 101 to the third electronic device 104. The cloud server 220 may store device information corresponding to an electronic device (e.g., the electronic device 101, the electronic device 102, and the electronic device 104 of FIG. 1) in a database. Hereinafter, for ease of understanding, the electronic device 101 is a first electronic device, the electronic device 102 is a second electronic device 102, and the electronic device 104 is a third electronic device 104 in the description. However, the electronic device is not limited by the description. The device information may include at least one of an identification number (or a unique number), a phone number, registration information, or a user account corresponding to each of the first electronic device 101 to the third electronic device 104.

The identification number may be a media access control (MAC) address that is uniquely assigned to each of the first electronic device 101 to the third electronic device 104. The registration information may be external device information associated with an external device registered with each of the first electronic device 101 to the third electronic device 104. A registered external device included in the registration information may indicate another external device which is not illustrated. The external device information may include an identification number (e.g., a MAC address) assigned to an external device or device detail information. The device detail information may include information associated with the type of an external device (e.g., display, input, output, or storage) or the attributes of an external device (e.g., display size or storage size). Alternatively, the external device information may include a registration date (e.g., a date) when an external device is registered. The user account may be a unique identification number assigned to a user who uses an electronic device (e.g., the first electronic device 101 to the third electronic device 104). The cloud server 220 may identify the first electronic device 101 to the third electronic device 104, based on the device information, and may identify the number of external devices 210 registered with each of the first electronic device 101 to the third electronic device 104, based on the external device information.

According to various embodiments, the cloud server 220 may determine a priority of an electronic device, based on the device information, and may select at least one of the first electronic device 101 to the third electronic device 104, based on the priority. The priority (or an order of priority, criteria to set a priority) may include a hub device, a device with the largest registration count, whether a voice agent is mounted, a latest registration record, or user account activation. The hub device may be a device that acts as a hub in a predetermined space (e.g., a house or an office). For example, the hub device may contain voice-recognition based artificial intelligence (AI) software and the Internet of things (IoT) function, such as an AI speaker or a TV. The hub device may receive a user voice via a microphone while a power source is turned on, and may process the same. The device with the largest registration count may be an electronic device with which the largest number of external devices are registered. Information associated with whether the voice agent is contained may indicate a device in which voice recognition-based artificial intelligence (AI) software is implemented. The recent registration record may indicate an electronic device that has the latest record of registering an external device. The user account activation indicates an electronic device of which a user account is in an activated state.

For example, if the first electronic device 101 is identified as a hub device, based on the device information, the cloud server 220 may select the first electronic device 101 as a device with which the external device 210 is to be registered. If the second electronic device 102 is identified as a device with the largest registration count, based on the device information, the cloud server 220 may select the second electronic device 102 as a device with which the external device 210 is to be registered. If the third electronic device 104 is identified as containing a voice agent, based on the device information, the cloud server 220 may select the third electronic device 104 as a device with which the external device 210 is to be registered. If the third electronic device 104 is identified as having the latest record of registering an external device, when compared to other electronic devices, based on the device information, the cloud server 220 may select the third electronic device 104 as a device with which the external device 210 is to be registered. The cloud server 220 may instruct the selected electronic device (e.g., at least one of the first electronic device 101 to the third electronic device 104) to provide a message for registering the external device 210. The instruction is a command to provide a message corresponding to a request signal, and may be a "register instruction". The cloud server 220 may instruct an electronic device, which is not selected, not to provide a message for registering the external device 210. The instruction is a command not to provide a message corresponding to a request signal, and may be a "discard instruction".

According to various embodiments, the cloud server 220 may determine an electronic device which corresponds to the largest number of priorities as an electronic device with which the external device 210 is to be registered. For example, if the first electronic device 101 is identified as a hub device and a device with the largest registration count, based on the device information, the cloud server 220 may select the first electronic device 101 as a device with which the external device 210 is to be registered. If the first electronic device 101 is identified as a hub device, a device with the largest registration count, and a device equipped with a voice agent, based on the device information, the cloud server 220 may select the first electronic device 101 as a device with which the external device 210 is to be registered. If the first electronic device 101 is identified as a hub device, a device with the largest registration count, a device equipped with a voice agent, and a device having the latest registration record, based on the device information, the cloud server 220 may select the first electronic device 101 as a device with which the external device 210 is to be registered. If the first electronic device 101 is identified as a hub device, a device with the largest registration count, a device equipped with a voice agent, a device having the latest registration record, and a device of which a user account is activated, based on the device information, the cloud server 220 may select the first electronic device 101 as a device with which the external device 210 is to be registered.

According to various embodiments, the cloud server 220 may receive device discovery information from the first electronic device 101 to the third electronic device 104. The device discovery information may be received from the first electronic device 101 to the third electronic device 104 when the first electronic device 101 to the third electronic device 104 receive a request signal from the external device 210. The device discovery information may include at least one of device information, context information, or identification information associated with the external device 210. If the device discovery information is received, the cloud server 220 may determine an electronic device with which the external device 210 is to be registered, based on the device information stored in the database.

According to various embodiments, the cloud server 220 may identify the validity of the request signal, based on context information included in the device discovery information. The context information may include time information associated with a time at which an electronic device receives the request signal or location information associated with an electronic device. The location information (e.g., GPS information) may be obtained from the electronic device, or may be obtained using information associated with an access point (AP) which is connected to the electronic device. If the difference between a time at which the device discovery information is received and the time information is within a predetermined period of time, the cloud server 220 may identify that the request signal is valid. If the difference between information associated with the external device 210 included in the device discovery information and the location information is within a predetermined distance, the cloud server 220 may identify that the request signal is valid. If the request signal is identified as being valid, the cloud server 220 may instruct the first electronic device 101 to the third electronic device 104 to provide a message for registering the external device 210 (register instruction). If the validity of the request signal is not identified, the cloud server 220 may instruct the first electronic device 101 to the third electronic device 104 not to provide a message for registering the external device 210 (discard instruction).

The external device 210 may broadcast a request signal for registration. The request signal may be a Bluetooth low energy (BLE) signal. The external device 210 may be a device which may be utilized for the Internet of things (IoT). For example, the external device 210 may be at least one of an electronic device, such as a smartphone, a tablet personal computer (table PC), a mobile phone, a video phone, an e-book reader, a desktop personal computer (desktop PC), a laptop personal computer (laptop PC), a netbook computer, a workstation, a personal digital assistant (PDA), a portable multimedia player (PMP), or an MP3 player, home appliance, such as an artificial intelligence (AI) speaker, a TV, a digital video disk (DVD) player, an audio, a refrigerator, an air conditioner, a cleaner, an oven, a microwave oven, a washing machine, an air purifier, a set-top box, a home automation control panel, a security control panel, a TV box (e.g., Samsung HomeSync™, apple TV™, or google TV™), a game console (e.g., Xbox™ or PlayStation™), an electronic dictionary, an electronic key, or a camcorder, a medical device, such as thermometer, a blood sugar meter, or a heart rate meter, magnetic resonance angiography (MRA), magnetic resonance imaging (MRI), computed tomography (CT), a camera, an ultrasonic camera, and a navigation device.

The external device 210 operates in a broadcast mode (or an advertise mode), and periodically transmits a request signal (e.g., a non-connectable advertising packet) for registering the external device 210 with an electronic device to all neighboring devices (e.g., the first electronic device 101 to the third electronic device 104). The request signal may include information associated with the external device 210.

According to various embodiments, the external device 210 may transmit a nonaudible frequency signal sequentially or in parallel with the request signal. The nonaudible frequency signal may be a signal sent in a frequency band beyond an audible frequency band. The audible frequency is a frequency signal in a band which is audible to a person and corresponds to 20 Hz ~20 KHz. The nonaudible frequency corresponds to a frequency band that is less than 20 Hz and greater than 20 Khz. The external device 210 may broadcast the nonaudible frequency signal sequentially or in parallel with the request signal. The external device 210 may encode the identification number (e.g., the MAC address) of the external device 210 in the nonaudible frequency signal, and may broadcast the same. According to various embodiments, the nonaudible frequency signal transmitted from the external device 210 may be different for each external device 210. For example, a nonaudible frequency signal may be set for each external device, like the identification number of the external device 210. A nonaudible frequency signal (e.g., 21 Hz) transmitted from a first external device and a nonaudible frequency signal (e.g., 100 Hz) transmitted from a second external device may be different.

The external device 210 may perform a registration (or pairing) process with an electronic device (e.g., at least one of the first electronic device 101 to the third electronic device 104) that transmits a response signal in response to the request signal. Hereinafter, for ease of understanding, it is described that an electronic device that transmits a response signal is the second electronic device 102. The disclosure is not limited by the description. The external device 210 may receive a scan request signal (e.g., a scan request) from the second electronic device 102 in response to the request signal. The external device 210 transmits a scan response signal (e.g., scan response) to the second electronic device 102 in response to the scan request signal, and may be paired with the second electronic device 102. The registration process corresponds to the art of the related art, and detailed descriptions thereof will be omitted.

According to various embodiments, the first electronic device 101 to the third electronic device 104 may periodically or selectively (e.g., in response to a user request) perform scanning in order to receive the request signal. If the first electronic device 101 to the third electronic device 104 receive the request signal, the first electronic device 101 to the third electronic device 104 may transmit device discovery information to the cloud server 220. If a registration instruction is received from the cloud server 220, after transmitting the device discovery information, the first electronic device 101 to the third electronic device 104 may provide a message for registering the external device 210. The message may include at least one of text, images, videos, and may be displayed on a display (e.g., a display device 160) in the form of a popup window. Alternatively, the first electronic device 101 to the third electronic device 104 may output a voice corresponding to the message via a speaker (e.g., the sound output device 155 of FIG. 1). If a discard instruction is received from the cloud server 220, the first electronic device 101 to the third electronic device 104 may not provide a message for registering the external device 210.

Figure 2B:
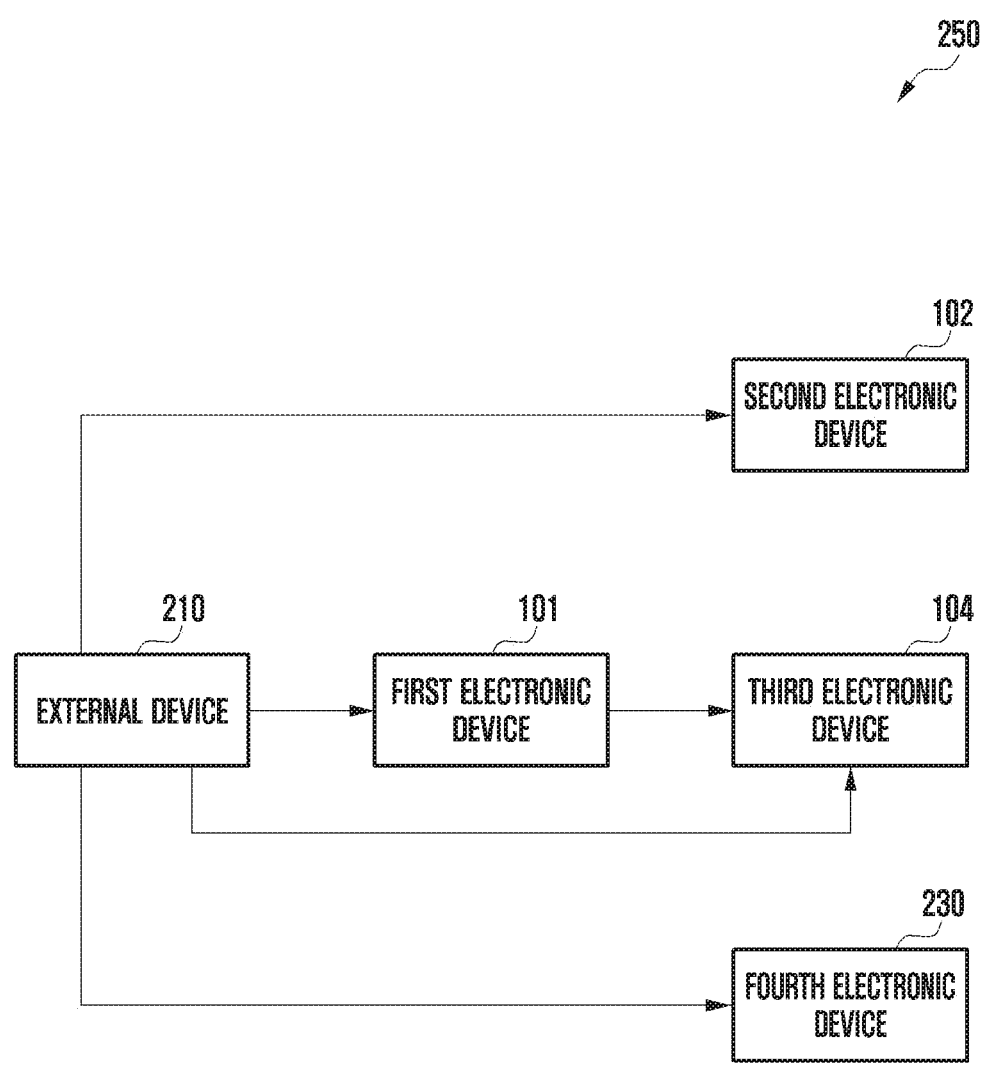
FIG. 2B is a diagram illustrating a network environment 250 between an electronic device and an external device according to various embodiments of the disclosure.

FIG. 2B is a diagram illustrating a network environment 250 between an electronic device and an external device according to various embodiments of the disclosure.

Referring to FIG. 2B, the external device 210, the first electronic device 101, the second electronic device 102, the third electronic device 104, or a fourth electronic device 230 may be at least one of an electronic device, such as a portable phone or a wearable device, home appliance, and a medical device.

The external device 210 may be a device which is not registered with the first electronic device 101, the second electronic device 102, the third electronic device 104, or the fourth electronic device 230. The external device 210 may broadcast a request signal for registration, to the first electronic device 101, the second electronic device 102, the third electronic device 104, or the fourth electronic device 230. The external device 210 may transmit a nonaudible frequency signal sequentially or in parallel with the request signal. The external device 210 may perform a registration (or pairing) process with an electronic device that transmits a response signal in response to the request signal (e.g., at least one of the first electronic device 101 to the fourth electronic device 230). The description of the external device 210 has been provided in detail with reference to FIG. 2A, and may be omitted here.

The first electronic device 101 may be a device of which registration with the second electronic device 102, the third electronic device 104, or the fourth electronic device 230 has been complete. The first electronic device 101 may be a hub device (e.g., an AI speaker, a computer, or a smart phone) within a predetermined space (e.g., a house or an office). The first electronic device 101 may have a right to register (or a right to control registration of) the external device 210. The first electronic device 101 may store device information corresponding to each of the second electronic device 102, the third electronic device 104, or the fourth electronic device 230 in a memory (e.g., the memory 130 of FIG. 1). The device information may include at least one of an identification number (or a unique number), a phone number, registration information, or a user account corresponding to each of the second electronic device 102, the third electronic device 104, or the fourth electronic device 230.

If the first electronic device 101 receives the request signal from the external device 210, the first electronic device 101 may select an electronic device with which the external devices 210 is to be registered, based on the device information. For example, based on the device information, the first electronic device 101 may select the third electronic device 104 as a device with which the external device 210 is to be registered. The first electronic device 101 may transmit a register instruction to the third electronic device 104, and may transmit a discard instruction to the second electronic device 102 and the fourth electronic device 230. According to various embodiments, the first electronic device 101 may or may not register the external device 210. The first electronic device 101 may determine whether to register the external device 210, based on the setting of the first electronic device 101 or a user setting. For example, the first electronic device 101 may transmit a register instruction to the third electronic device 104, and may proceed with registration of the external device 210.

The second electronic device 102, the third electronic device 104, and the fourth electronic device 230 may be an electronic device (e.g., a smart phone) of an occupant or an IoT device (e.g., an AI speaker, TV, or computer) within a predetermined space (e.g., a house or an office). The second electronic device 102, the third electronic device 104, and the fourth electronic device 230 may receive a request signal from the external device 210. The second electronic device 102, the third electronic device 104, and the fourth electronic device 230 may wait until an instruction (e.g., a register instruction or a discard instruction) is received from the first electronic device 101. If the third electronic device 104 receives a register instruction from the first electronic device 101, the first electronic device 101 may provide a message for registering the external device 210. If the second electronic device 102 and the fourth electronic device 230 receives a discard instruction from the first electronic device 101, the second electronic device 102 and the fourth electronic device 230 may not provide a message for registering the external device 210.

A method described below may show operations performed by an electronic device (e.g., the electronic device 101 of FIG. 1) which is selected as a subject device in a predetermined space (e.g. a house or an office). The subject device may be an electronic device which has a right to control another electronic device (e.g., the second electronic device 102 to the fourth electronic device 230). The electronic device 101 may store information corresponding to the second electronic device 102 to the fourth electronic device 230 in a memory (e.g., the memory 130). According to various embodiments, the electronic device 101 may interoperate with the cloud server 220, and may control registration between another electronic device (e.g., the second electronic device 102 to the fourth electronic device 230) and the external device 210. Alternatively, the cloud server 220 may control registration between the external device 210 and the electronic device 101, the second electronic device 102, the third electronic device 104, or the fourth electronic device 230.

An electronic device (e.g., the electronic device 101 of FIG. 1) according to various embodiments may include a communication module (e.g., the communication module 190 of FIG. 1), a memory (e.g., the memory 130 of FIG. 1), and a processor (e.g., the processor 120 of FIG. 1), wherein the processor is configured to: receive a broadcasted request signal for registering an external device, from the external device (e.g., the external device 210 of FIGS. 2A and 2B) via the communication module; identify whether a nonaudible frequency signal is received from the external device; and provide a message for registering the external device if the nonaudible frequency signal is received.

If the nonaudible frequency signal is not received, the processor may be configured not to provide a message for registering the external device.

The processor may be configured to identify whether the nonaudible frequency signal is received within a predetermined period of time after the request signal is received.

The memory may store device information corresponding to another electronic device, and the processor may be configured to identify another electronic device with which the external device is to be registered, based on the device information.

The processor may be configured to: determine a priority of the other electronic device, based on the device information; and select the other electronic device with which the external device is to be registered with, based on the priority.

The priority may include at least one of a hub device, a device having a largest registration count, whether a voice agent is mounted, a latest registration record, or user account activation.

The processor may be configured to select one or a plurality of other electronic devices, based on at least one of a setting of the electronic device, a user setting, or the device information.

The processor may be configured to: select the electronic device as a device with which the external device is to be registered, based on at least one of the setting of the electronic device, the user setting, or the device information, and to instruct the other electronic device not to provide a message for registering the external device.

The processor may be configured to select the electronic device as a device with which the external device is to be registered, based on at least one of the settings of the electronic device, the user setting, or the device information, and to instruct the other electronic device to provide a message for registering the external device.

The processor may be configured to instruct the identified other electronic device to provide a message for registering the external device.

The processor may be configured to: determine whether an identification number of the external device corresponding to the request signal matches an identification number of the external device corresponding to the nonaudible frequency signal; and if the identification numbers of the external devices match, provide a message for registering the external device.

The processor may be configured to: receive device discovery information from another electronic device; extract context information included in the device discovery information; verify a validity of the request signal, based on the context information; and instruct the other electronic device to provide a message for registering the external device, based on a verification result.

The context information may include time information associated with a time at which the other electronic device that transmits the device discovery information receives the request signal, or location information associated with the other electronic device.

If the difference between a time at which the device discovery information is received and the time information included in the context information is within a predetermined period of time, the processor may be configured to determine that the request signal is valid.

If the difference between information associated with an external device included in the device discovery information and the location information included in the context information is within a predetermined distance, the processor may be configured to determine that the request signal is valid.

Figure 3:
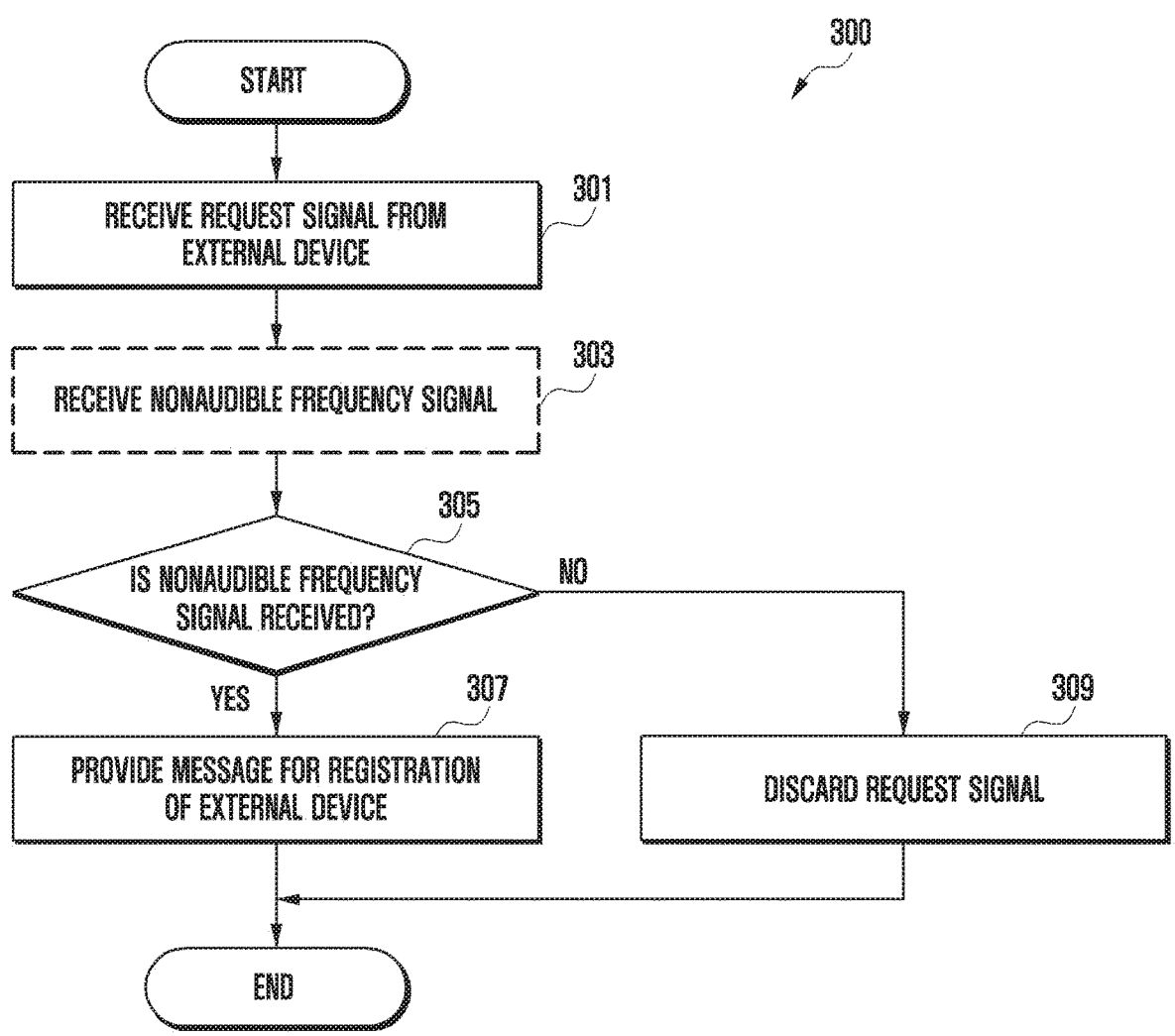
FIG. 3 is a flowchart 300 illustrating an operation method of an electronic device according to various embodiments of the disclosure.

FIG. 3 is a flowchart 300 illustrating an operation method of an electronic device according to various embodiments of the disclosure.

Referring to FIG. 3, in operation 301, a processor (e.g., the processor 120 of FIG. 1) of an electronic device (e.g., the electronic device 101 of FIG. 1) according to various embodiments may receive a request signal from an external device (e.g., the external device 210 of FIG. 2A). The request signal may be a BLE signal. The external device 210 may be a device which may be utilized for the IoT. For example, the external device 210 may be at least one of an electronic device, such as a portable phone or a wearable device, home appliance, and a medical device. For example, if a user purchases a new external device 210, the external device 210 may broadcast a request signal for registration. The external device 210 operates in a broadcast mode, and periodically transmits a request signal (e.g., a non-connectable advertising packet) to all neighboring devices. The request signal may include information associated with the external device 210. The information associated with the external device 210 may include an identification number (e.g., a MAC address) assigned to the external device 210 or device information associated with the external device 210. The processor 120 may periodically or selectively perform scanning in order to receive the request signal.

In operation 303, the processor 120 may receive a nonaudible frequency signal. In the case in which the external device 210 broadcasts a request signal, the external device 210 may transmit a nonaudible frequency signal. The nonaudible frequency signal may be a signal sent in a frequency band beyond an audible frequency band. The audible frequency is a frequency signal in a band which is audible to a person and corresponds to 20 Hz ~20 KHz. The nonaudible frequency corresponds to a frequency band that is less than 20 Hz and greater than 20 Khz. The external device 210 may broadcast the nonaudible frequency signal sequentially or in parallel with the request signal. The external device 210 may encode the identification number (e.g., the MAC address) of the external device 210 in the nonaudible frequency signal, and may broadcast the same. The external device 210 may transmit a predetermined nonaudible frequency signal corresponding to the identification number.

According to various embodiments, in the case of a nonaudible frequency signal, a transmission distance is short, and thus, the nonaudible frequency signal may not pass through an obstacle (e.g., a wall). The processor 120 may or may not receive the nonaudible frequency signal.

In operation 305, the processor 120 may determine whether the nonaudible frequency signal is received. The processor 120 may determine whether the nonaudible frequency signal is received within a predetermined period of time (e.g., 10 seconds, 30 seconds, or 1 minute) after receiving the request signal. If the nonaudible frequency signal is received, the processor 120 may perform operation 307. If the nonaudible frequency signal is not received, the processor 120 may perform operation 309.

If the nonaudible frequency signal is received (YES), the processor 120 may provide a message for registering an external device in operation 307. Since the nonaudible frequency signal does not pass through an obstacle, the fact that the nonaudible frequency signal is received may indicate that the nonaudible frequency signal is incurred from the external device 210 within the house or the office of a user of the electronic device 101. If the nonaudible frequency signal is received, the processor 120 may determine that registration of the external device 210 with the electronic device 101 is needed. The processor 120 may display the message corresponding to the request signal on a display (e.g., the display device 160 of FIG. 1) in order to inform a user that registration of the external device 210 is needed. The message may include at least one of text, images, and videos, and may be provided to the display device 160 in the form of a popup window. Alternatively, the processor 120 may output a voice corresponding to the message via a speaker (e.g., the sound output device 155 of FIG. 1).

According to various embodiments, the processor 120 may determine whether the received nonaudible frequency signal corresponds to the predetermined nonaudible frequency corresponding to the identification number of the external device 210. Like the identification number of the external device 210, a nonaudible frequency signal may be uniquely assigned for each external device 210. The processor 120 may determine whether the identification number included in the request signal received in operation 301 matches the identification number corresponding to the nonaudible frequency signal received in operation 303. If the identification numbers match, the processor 120 may provide a message for registering an external device. Alternatively, if the identification numbers do not match, the processor 120 may not provide a message for registering an external device.

According to various embodiments, the processor 120 may perform registration (or paring) with the external device 210 according to the intention of a user who views the message. For example, if the user who identifies the message requests registration of the external device 210, the processor 120 may transmit a scan request signal (e.g., a scan request) as a response to the request signal. The processor 120 may receive a scan response signal (e.g., a scan response) from the external device 210 in response to the scan request signal. The processor 120 receives the scan response signal, and may perform paring (registration) with the external device 210. The registration process with the external device 210 corresponds to the art of the related art, and detailed descriptions thereof will be omitted.

If the nonaudible frequency signal is not received (NO) in operation 309, the processor 120 may discard the request signal. Since the nonaudible frequency signal does not pass through a wall, the fact that the nonaudible frequency signal is not received may indicate that the nonaudible frequency signal is incurred from the external device 210 located in a place (e.g., a next door house) that is blocked by a wall and is separated from the electronic device 101. If the nonaudible frequency signal is not received, the processor 120 may determine that registration of the external device 210 with the electronic device 101 is not needed. The processor 120 may not provide a message corresponding to the request signal. The processor 120 does not provide a message in response to the request signal that is unnecessary for a user, and may improve convenience for the user.

Figure 4:
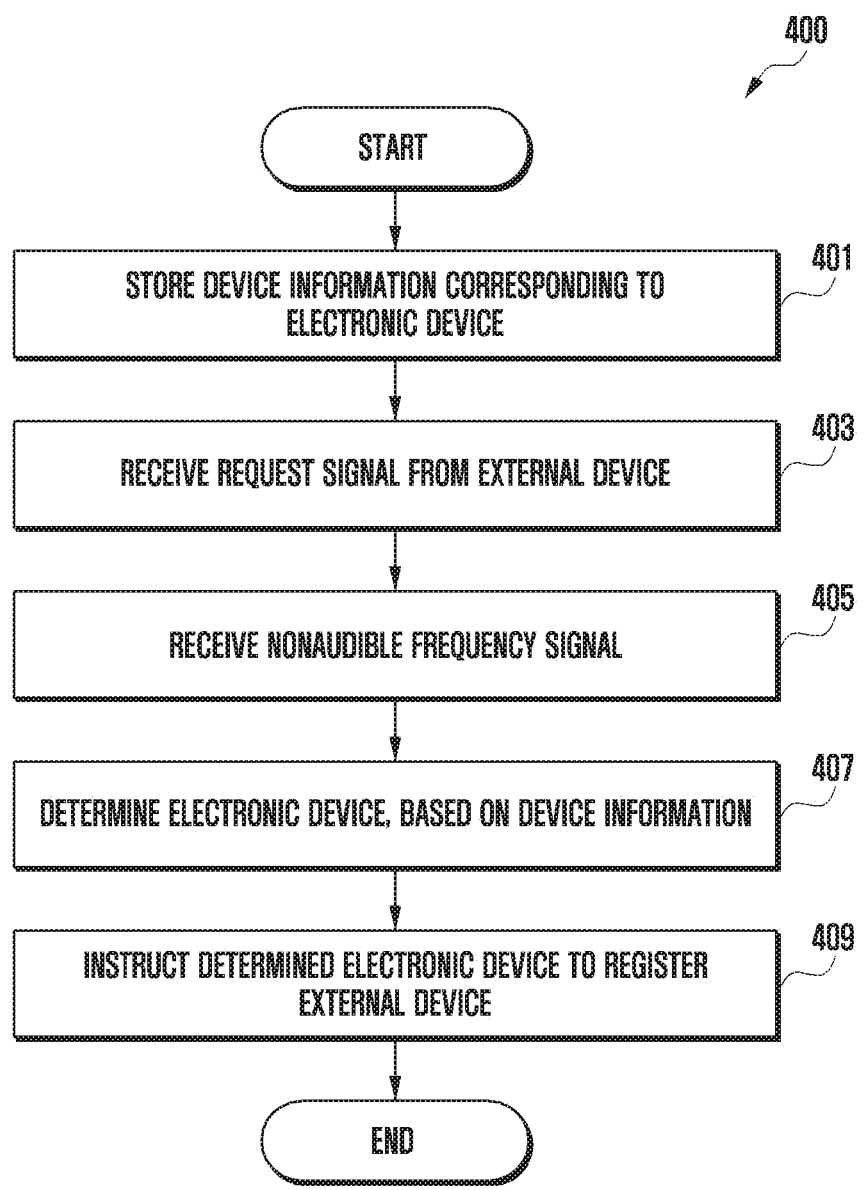
FIG. 4 is a flowchart 400 illustrating a method of providing a message for registering an external device, by an electronic device according to various embodiments of the disclosure.

FIG. 4 is a flowchart 400 illustrating a method of providing a message for registering an external device, by an electronic device according to various embodiments of the disclosure.

Referring to FIG. 4, in operation 401, a processor (e.g., the processor 120 of FIG. 1) of an electronic device (e.g., the electronic device 101 of FIG. 1) according to various embodiments may store device information corresponding to an electronic device. For example, the processor 120 may store device information corresponding to each of the second electronic device 102, the third electronic device 104, and the fourth electronic device 230 of FIG. 2B in a memory (e.g., the memory 130). The device information may include at least one of an identification number (or unique number), a phone number, registration information, or a user account corresponding to an electronic device. The identification number may be a MAC address uniquely assigned to an electronic device. The registration information may be external device information associated with an external device registered with an electronic device. The external device information may include an identification number (e.g., a MAC address) assigned to the external device or device detail information. The device detail information may include information associated with the type of an external device (e.g., display, input, output, or storage) or the attributes of an external device (e.g., display size or storage size). The user account may be a unique identification number assigned to a user who uses an electronic device.

In operation 403, the processor 120 may receive a request signal from an external device (e.g., the external device 210 of FIG. 2A). The external device 210 may be a device which may be utilized for the IoT. For example, if a user purchases a new external device 210, the external device 210 may broadcast a request signal for registration. The request signal may include information associated with the external device 210. Operation 403 is the same as, or similar to, operation 301 of FIG. 3, and a detailed description thereof may be omitted.

According to various embodiments, the processor 120 may determine whether a received nonaudible frequency signal corresponds to a predetermined nonaudible frequency corresponding to the identification number of the external device 210. The processor 120 may determine whether the identification number included in the request signal received in operation 403 matches the identification number corresponding to a nonaudible frequency signal received in operation 405. If the identification numbers match, the processor 120 may perform operation 407. Alternatively, if the identification numbers do not match, the processor 120 may not perform operation 407.

In operation 405, the processor 120 may receive a nonaudible frequency signal from the external device 210. In the case in which the external device 210 broadcasts a request signal, the external device 210 may transmit a nonaudible frequency signal. The nonaudible frequency signal may be a signal sent in a frequency band beyond an audible frequency band. The nonaudible frequency corresponds to a frequency band that is less than 20 Hz and greater than 20 Khz. The external device 210 may broadcast the nonaudible frequency signal sequentially or in parallel with the request signal. Operation 405 is the same as, or similar to, operation 303 of FIG. 3, thus detailed descriptions thereof may be omitted.

In operation 407, the processor 120 may determine an electronic device based on the device information. The processor 120 may determine a priority of an electronic device based on the device information, and may select (or an identify) an electronic device with which an external device is to be registered, based on the priority. The priority may include at least one of a hub device, a device with the largest registration count, whether a voice agent is mounted, the latest registration record, or user account activation. The hub device may be a device that acts as a hub in a predetermined space (e.g., a house or an office). For example, the hub device may contain a voice recognition-based artificial intelligence (AI) software and an Internet of things (IoT) function, such as an AI speaker or a TV. The hub device may listen to a user voice via a microphone while a power source is turned on, and may process the same. The device with the largest registration count may be an electronic device with which the largest number of external devices are registered. Information associated with whether the voice agent is contained may indicate whether a corresponding device is a device in which voice recognition-based artificial intelligence (AI) software is implemented. The latest registration record may indicate a device that has the latest record of registering an external device. The user account activation indicates an electronic device of which a user account is in an activated state.

For example, if the second electronic device 102 is identified as a hub device, based on the device information, the processor 120 may select the second electronic device 102 as a device with which the external device 210 is to be registered. Alternatively, if the third electronic device 104 is identified as a device having the largest registration count, based on the device information, the processor 120 may select the third electronic device 104 as a device with which the external device 210 is to be registered. If the fourth electronic device 230 is identified as containing a voice agent, based on the device information, the processor 120 may select the fourth electronic device 230 as a device with which the external device 210 is to be registered. If the third electronic device 104 is identified as a device having the latest record of registering an external device, when compared to other electronic devices, based on the device information, the processor 120 may select the third electronic device 104 as a device with which the external device 210 is to be registered.

According to various embodiments, the processor 120 may select one or a plurality of electronic devices, based on at least one of the setting of the electronic device 101, a user setting, or device information. For example, the processor 120 may select one of the second electronic device 102, the third electronic device 104, or the fourth electronic device 230, as a device with which the external device 210 is to be registered. The processor 120 may select the second electronic device 102 and the third electronic device 104 as devices with which the external device 210 is to be registered. The processor 120 may select the second electronic device 102 and the fourth electronic device 230 as devices with which the external device 210 is to be registered. The processor 120 may select the third electronic device 104 and the fourth electronic device 230 as devices with which the external device 210 is to be registered. The processor 120 may select the second electronic device 102, the third electronic device 104, and the fourth electronic device 230 as devices with which the external device 210 is to be registered.

In operation 409, the processor 120 may instruct the determined electronic device to register an external device. The processor 120 may instruct the selected electronic device (e.g., at least one of the second electronic device 102, the third electronic device 104, or the fourth electronic device 230) to provide a message for registering the external device 210. The instruction is a command to provide a message corresponding to a request signal, and may be a "register instruction". For example, if the determined electronic device is the second electronic device 102, the processor 120 may transmit a register instruction to the second electronic device 102. The second electronic device 102 that receives the register instruction may provide a message for registering the external device 210 in response to the request signal. Alternatively, the processor 120 may instruct the third electronic device 104 and the fourth electronic device 230, which are not selected, not to provide a message for registering the external device 210. The instruction is a command not to provide a message corresponding to a request signal, and may be a "discard instruction". The third electronic device 104 and the fourth electronic device 230, which receive the discard instruction, may not provide a message for registering the external device 210 in response to the request signal.

According to various embodiments, if the electronic device 101 (e.g., the device itself) is a hub device, the processor 120 may select the electronic device 101 as a device with which the external device 210 is to be registered. The processor 120 may register the external device 210 with the electronic device 101, and may transmit a discard instruction to the second electronic device 102, the third electronic device 104, or the fourth electronic device 230. Alternatively, the processor 120 may register the external device 210 with the electronic device 101, and may transmit a register instruction to at least one of the second electronic device 102, the third electronic device 104, or the fourth electronic device 230.

Figure 5:
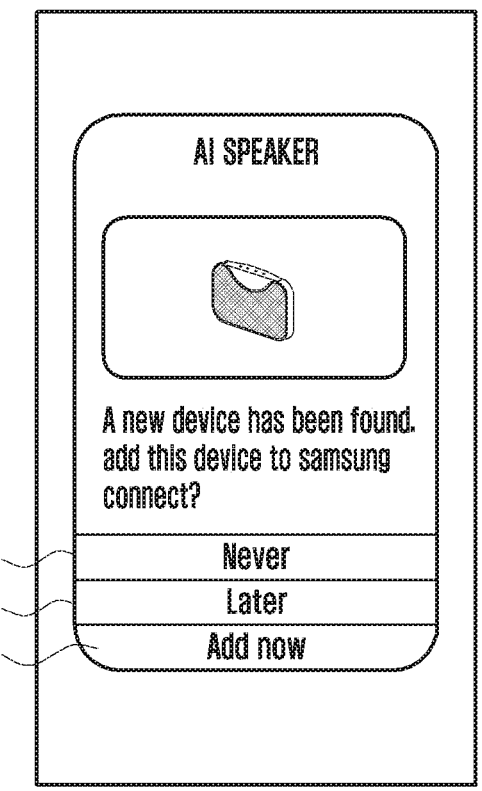
FIG. 5 is a diagram illustrating an example of a user interface for registering an external device according to various embodiments of the disclosure.
Figure 5:
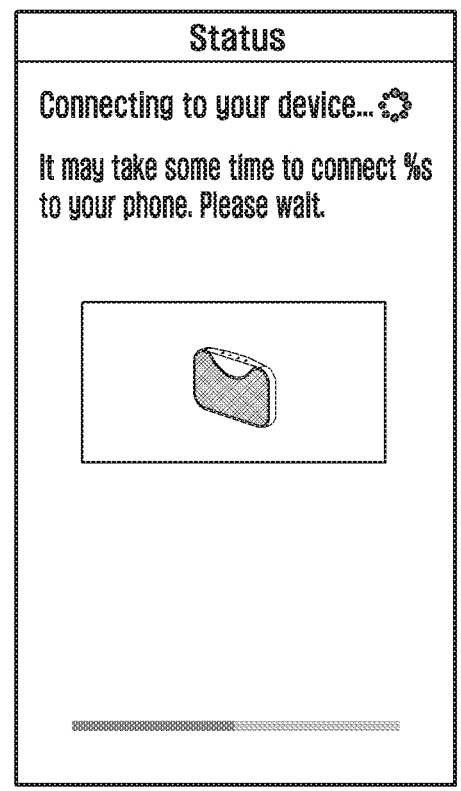

FIG. 5 is a diagram illustrating an example of a user interface for registering an external device according to various embodiments of the disclosure.

Referring to FIG. 5, a processor (e.g., the processor 120 of FIG. 1) of an electronic device (e.g., the electronic device 101 of FIG. 1) according to various embodiments may provide a first user interface 510 for registering an external device (e.g., an AI speaker) (e.g., the external device 210 of FIGS. 2A and 2B). The first user interface 510 may include at least one of text (e.g., a new device has been found), an image (e.g., the image of the external device 210), or a video in association with registration of the external device 210. Alternatively, the processor 120 may output a voice speaker (e.g., the sound output device 155 of FIG. 1) corresponding to the first user interface 510. Also, the first user interface 510 may include a button for receiving a user input to the message. For example, the button may include at least one of a cancel button 511 (Never), a put-off button 513 (later), or an add button 515 (Add now).

If the add button 515 is selected, the processor 120 may provide the second user interface 520. The second user interface 520 may provide, to a user, information indicating that the external device 210 is being registered. The second user interface 520 may include at least one of text (e.g., connecting to your device), an image (e.g., the image of the external device 210), or a video.

According to various embodiments, if the cancel button 511 is selected, the processor 120 may not provide the first user interface 510. The processor 120 may remove the first user interface 510 provided in the form of a popup-window, and may provide a screen displayed before the first user interface 510 is provided. If the put-off button 513 is selected, the processor 120 may not provide the first user interface 510. The processor 120 may remove the first user interface 510 provided in the form of a popup-window, and may provide a screen displayed before the first user interface 510 is provided. Also, the processor 120 may provide the first user interface 510 again after a predetermined period of time (e.g., one hour or three hours).

Figure 6:
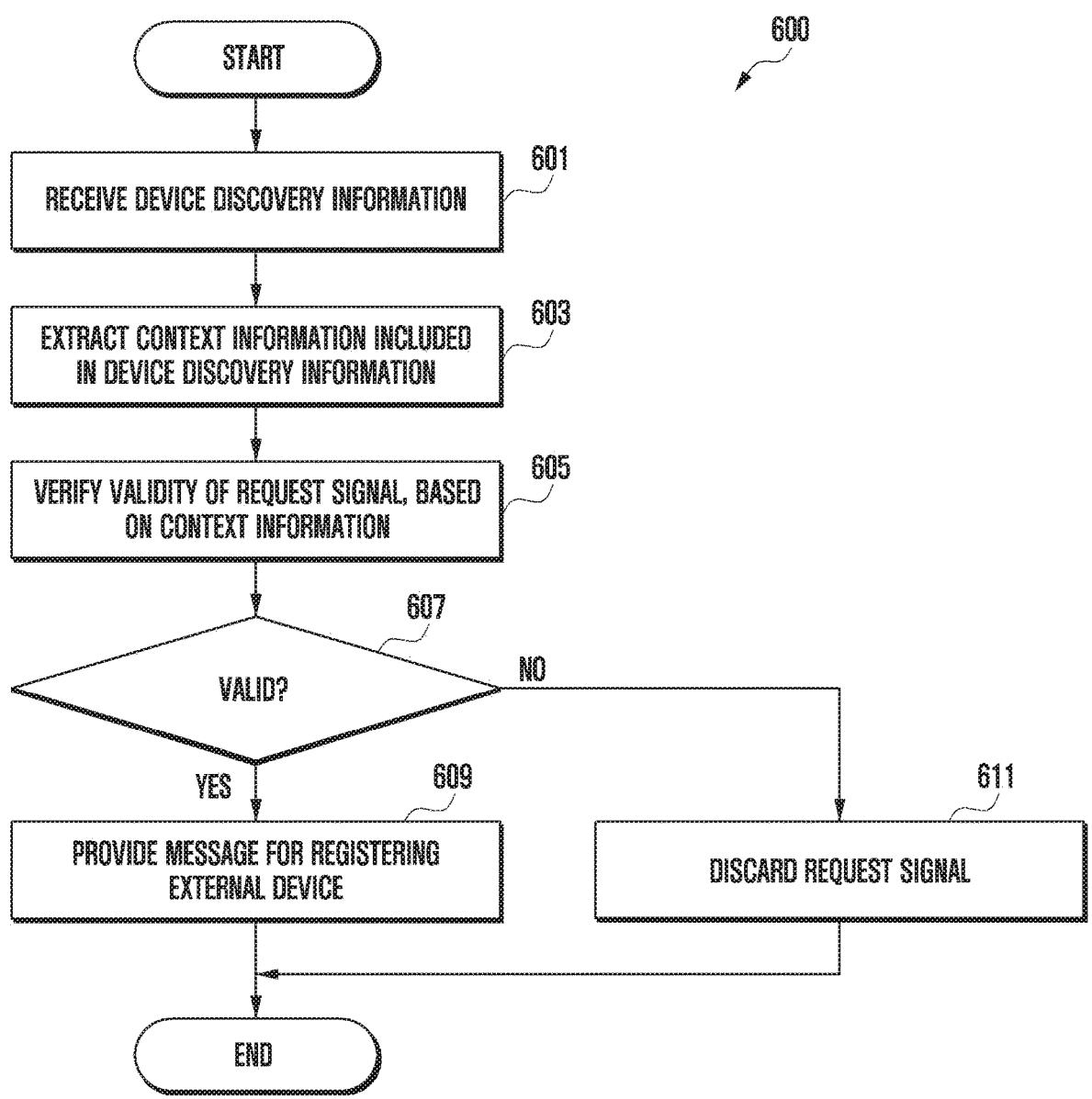
FIG. 6 is a flowchart 600 illustrating a method of providing a message for registering an external device, based on context information, by an electronic device according to various embodiments of the disclosure.

FIG. 6 is a flowchart 600 illustrating a method of providing a message for registering an external device, based on context information, by an electronic device according to various embodiments of the disclosure.

Referring to FIG. 6, in operation 601, a processor (e.g., the processor 120 of FIG. 1) of an electronic device (e.g., the electronic device 101 of FIG. 1) according to various embodiments may receive device discovery information. The device discovery information may be received from at least one of the second electronic device 102, the third electronic device 104, or the fourth electronic device 230. If the second electronic device 102, the third electronic device 104, or the fourth electronic device 230 receive a request signal for external device registration from an external device (e.g., the external device 210 of FIGS. 2A and 2B), the second electronic device 102, the third electronic device 104, or the fourth electronic device 230 may transmit the device discovery information to the electronic device 101. The device discovery information may include at least one of device information, context information, or identification information associated with the external device 210. The device information may be device information associated with an electronic device that transmits the device discovery information (e.g., the second electronic device 102, the third electronic device 104, or the fourth electronic device 230) The context information may include time information associated with a time at which the electronic device that transmits the device discovery information receives the request signal, or location information associated with the electronic device. The identification information may be an identification number corresponding to the external device 210 that transmits the request signal.

According to various embodiments, the processor 120 may store device information stored in the memory 130, before operation 601. The processor 120 may download the device information from the cloud server 220, and may store the same in the memory 130. The device information may include at least one of an identification number (or a unique number), a phone number, registration information, or a user account corresponding to each of the second electronic device 102, the third electronic device 104, or the fourth electronic device 230. The processor 120 may wait until the device discovery information is received from an electronic device included in the device information. For example, if the device discovery information is received from the second electronic device 102 and the fourth electronic device 230, but the device discovery information is not received from the third electronic device 104, the processor 120 may wait until the device discovery information is received from the third electronic device 104.

In operation 603, the processor 120 may extract context information included in the device discovery information. The device discovery information may include at least one of device information, context information, or identification information associated with the external device 210. The processor 120 may extract the context information from the device discovery information.

In operation 605, the processor 120 may verify (or identify) the validity of the request signal, based on the context information. For example, the processor 120 may identify whether the difference between a time at which the device discovery information is received and the time information included in the context information is within a predetermined period of time. Alternatively, the processor 120 may determine the validity of the request signal, based on a network environment. For example, the processor 120 may set the predetermined period of time in consideration of an error range (e.g., 3 seconds or 5 seconds) associated with a signal delay. The time information may be time information associated with a time at which the electronic device that transmits the device discovery information receives the request signal. Alternatively, the processor 120 may identify whether the difference between information associated with the external device 210 included in the device discovery information and location information included in the context information is within a predetermined distance. The location information may be location information (e.g., the current location information) of the electronic device that transmits the device discovery information.

In operation 607, the processor 120 may determine whether the request signal is valid. For example, if the difference between the time at which the device discovery information is received and the time information is within a predetermined period of time, the processor 120 may identify that the request signal is valid. If the difference between information associated with the external device 210 included in the device discovery information and the location information is within a predetermined distance, the processor 120 may identify that the request signal is valid. If the request signal is valid, the processor 120 may proceed with operation 609. If the request signal is invalid, the processor 120 may proceed with operation 611.

If the request signal is valid, the processor 120 may provide a message for registering the external device 120 in operation 609. The processor 120 may instruct (e.g., register instruction) the electronic device that transmits the device discovery information to provide the message. According to various embodiments, the processor 120 may determine the second electronic device 102 among the second electronic device 102, the third electronic device 104, or the fourth electronic device 230 which transmit the device discovery information, based on the device information, to be an electronic device with which the external device 210 is to be registered. The processor 120 may transmit a register instruction to the second electronic device 102.

If the request signal is invalid, the processor 120 may provide an instruction to discard the request signal in operation 611. The processor 120 may instruct (e.g., discard instruction) the electronic device that transmits the device discovery information not to provide a message for registering the external device 120. According to various embodiments, if the processor 120 transmits a register instruction to the second electronic device 102, the processor 120 may transmit a discard instruction to the third electronic device 104 or the fourth electronic device 230.

Figure 7:
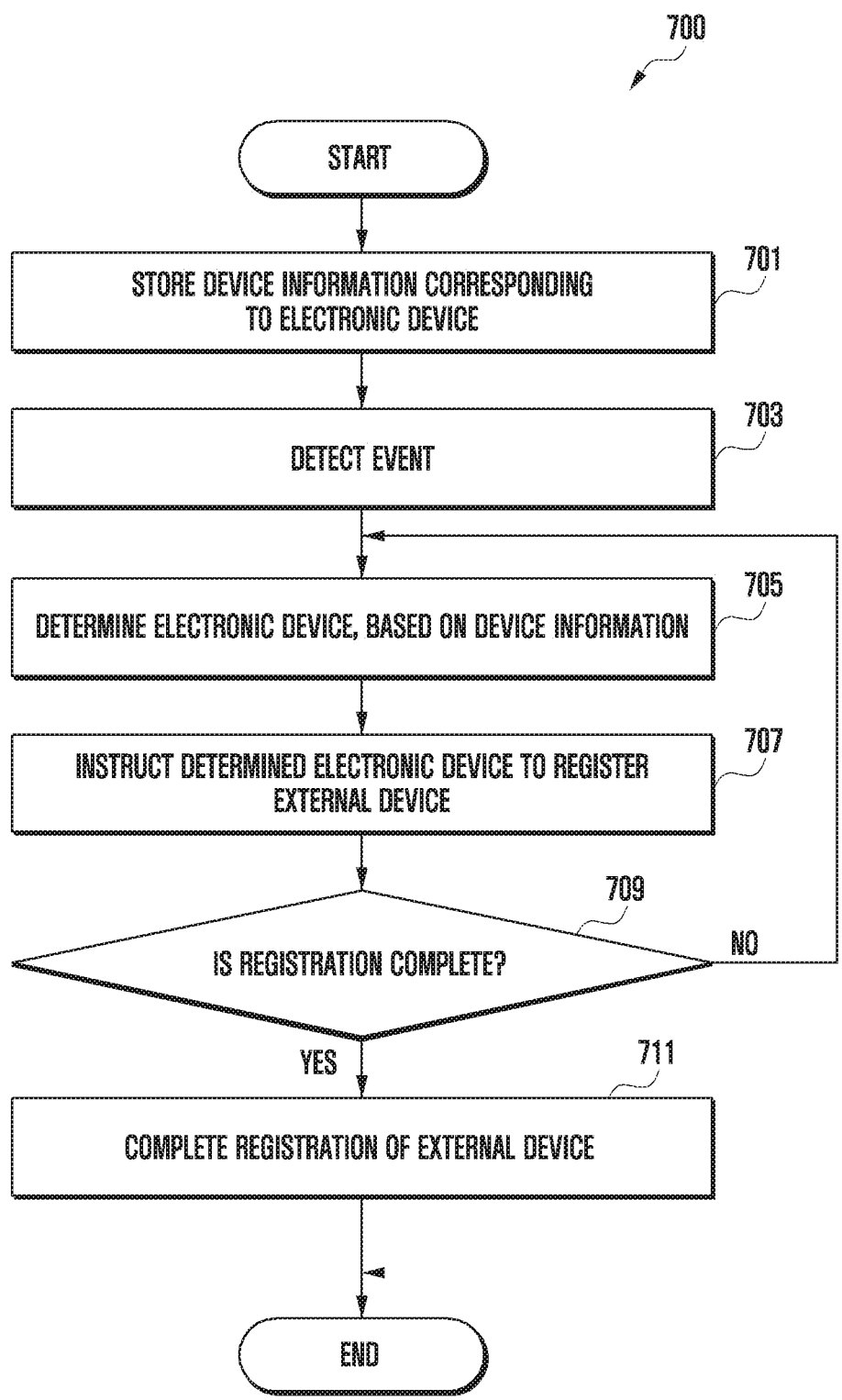
FIG. 7 is a flowchart 700 illustrating a method of determining an electronic device with which an external device is to be registered according to various embodiments of the disclosure.

FIG. 7 is a flowchart 700 illustrating a method of determining an electronic device with which an external device is to be registered according to various embodiments of the disclosure.

Referring to FIG. 7, in operation 701, a processor (e.g., the processor 120 of FIG. 1) of an electronic device (e.g., the electronic device 101 of FIG. 1) according to various embodiments may store device information corresponding to an electronic device. The electronic device may include the second electronic device 102, the third electronic device 104, or the fourth electronic device 230 of FIG. 2B. The device information may include at least one of an identification number (or a unique number), a phone number, registration information, or a user account corresponding to each of to the second electronic device 102, the third electronic device 104, or the fourth electronic device 230. The processor 120 may store the device information in a memory (e.g., the memory 130 of FIG. 1).

In operation 703, the processor 120 may detect an event. The event may be reception of device discovery information or reception of a request signal. If the device discovery information is received from at least one of the second electronic device 102, the third electronic device 104, or the fourth electronic device 230, the processor 120 may identify that the event is detected. Alternatively, if a request signal is received from the external device 210 of FIGS. 2A and 2B, the processor 120 may identify that the event is detected. If the request signal is received, the processor 120 may or may not receive a nonaudible frequency signal. According to various embodiments, if the nonaudible frequency signal is received together with the request signal, the processor 120 may identify that the event is detected.

In operation 705, the processor 120 may determine an electronic device, based on the device information. The processor 120 may determine a priority of an electronic device, based on the device information, and may select at least one of the second electronic device 102, the third electronic device 104, or the fourth electronic device 230, based on the priority. The priority may include at least one of a hub device, a device with the largest registration count, whether a voice agent is mounted, or user account activation. The hub device may be a device that acts as a hub in a predetermined space (e.g., a house or an office). For example, the hub device may contain a voice-recognition based artificial intelligence (AI) software and an Internet of things (IoT) function, such as an AI speaker or a TV. The device with the largest registration count may be an electronic device with which the largest number of external devices are registered. Information associated with whether the voice agent is contained may indicate whether a corresponding device is a device in which voice recognition-based artificial intelligence (AI) software is implemented. The user account activation indicates an electronic device of which the user account is in an activated state.

For example, if the second electronic device 102 is a hub device, based on the device information, the processor 120 may select the second electronic device 102 as a device with which the external device 210 is to be registered. Alternatively, if the third electronic device 104 is a device having the largest registration count, based on the device information, the processor 120 may select the third electronic device 104 as a device with which the external device 210 is to be registered. If the fourth electronic device 230 is identified as containing a voice agent, based on the device information, the processor 120 may select the fourth electronic device 230 as a device with which the external device 210 is to be registered.

In operation 707, the processor 120 may instruct the determined (or selected) electronic device to register an external device. The processor 120 may transmit a register instruction to the electronic device (e.g., the second electronic device 102) which is selected as a device with which the external device 210 is to be registered. If the second electronic device 102 receives the register instruction, the second electronic device 102 may provide a message for registering the external device 210. For example, the second electronic device 102 provides the first user interface 510 as shown in FIG. 5, and provides the second user interface 520 depending on a selection by a user of the second electronic device 102. According to various embodiments, the processor 120 may or may not transmit a discard instruction to another electronic device which is not selected (e.g., the third electronic device 104 or the fourth electronic device 230).

In operation 709, the processor 120 may identify whether registration of the external device is complete. The external device 210 may be registered with the second electronic device 102 depending on a selection made by a user. If the registration of the external device 210 is complete, the second electronic device 102 may transmit the device information of the second electronic device 102 to the electronic device 101. The second electronic device 102 may update the device information of itself. The device information may include at least one of an identification number, a phone number, registration information, or a user account of the second electronic device 102. The registration information may include the information associated with an external device that is registered with the second electronic device 102. If the information associated with the external device 210 is included in the device information received from the second electronic device 102, the processor 120 may determine that the registration of the external device is complete. The processor 120 may receive the device information from the second electronic device 102 within a predetermined period of time (e.g., 10 minutes, one hour, a day) after transmitting the register instruction.

If the registration is complete, the processor 120 may perform operation 711. If the registration is not complete, the processor 120 may return to operation 705. According to various embodiments, if the device information is not received from the second electronic device 102 within a predetermined period of time, the processor 120 may determine that registration is not complete. If the second electronic device 102 does not register the external device 210, the processor 120 may return to operation 705. The processor 120 may proceed with operation 705, and may select at least one of the third electronic device 104 or the fourth electronic device 230, based on the device information, as a device with which the external device 210 is to be registered.

In operation 711, the processor 120 may complete registration of the external device. If the device information is received from the second electronic device 102, the processor 120 may store the received device information in the memory 130, and may complete the registration of the external device. Also, if the device information is received from the third electronic device 104, the processor 120 may store the received device information in the memory 130, and may complete the registration of the external device. Alternatively, if the device information is received from the fourth electronic device 230, the processor 120 may store the received device information in the memory 130, and may complete the registration of the external device.

Figure 8:
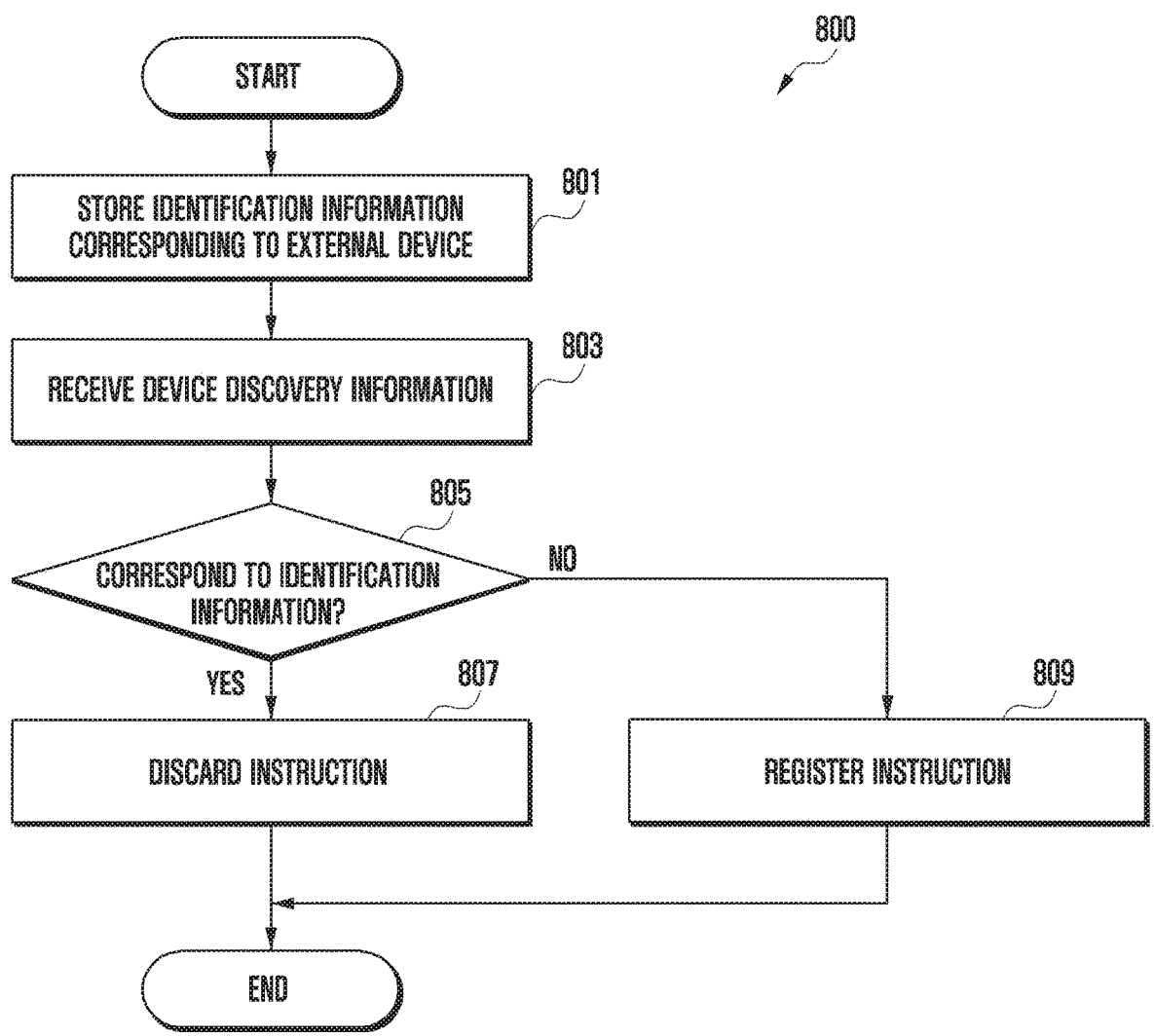
FIG. 8 is a flowchart 800 illustrating a method of processing a request signal related to a predetermined external device according to various embodiments of the disclosure.

FIG. 8 is a flowchart 800 illustrating a method of processing a request signal related to a predetermined external device according to various embodiments of the disclosure.

Referring to FIG. 8, in operation 801, a processor (e.g., the processor 120 of FIG. 1) of an electronic device (e.g., the electronic device 101 of FIG. 1) according to various embodiments may store identification information corresponding to an external device (e.g., the external device 210 of FIGS. 2A and 2B). The identification information may be an identification number (e.g., a MAC address) assigned to the external device 210. If the external device 210 is disposed (or installed) in a public place (e.g., a department store, a supermarket, a bus station, or a subway station), the processor 120 may store identification information corresponding to the external device 210 in a memory (e.g., the memory 130 of FIG. 1) in advance. The processor 120 may download identification information corresponding to the external device 210 from the cloud server 220, and may store the same in the memory 130.

In operation 803, the processor 120 may receive device discovery information. The processor 120 may receive the device discovery information from at least one of the second electronic device 102, the third electronic device 104, or the fourth electronic device 230. The second electronic device 102, the third electronic device 104, or the fourth electronic device 230 may transmit the device discovery information to the electronic device 101, when the second electronic device 102, the third electronic device 104, or the fourth electronic device 230 receives a request signal from an external device. The device discovery information may include at least one of device information, context information, or identification information of the external device 210.

In operation 805, the processor 120 may identify whether the stored identification information corresponds to information associated with the external device 210 included in the device discovery information. If the stored identification information corresponds to the information associated with the external device 210 included in the device discovery information, the processor 120 proceeds with operation 807. If the stored identification information does not correspond to the information associated with the external device 210 included in the device discovery information, the processor 120 may proceed with operation 809.

If the stored identification information corresponds to the information associated with the external device 210 included in the device discovery information, the processor 120 may transmit a discard instruction in operation 807. For example, the processor 120 may transmit a discard instruction to at least one of the second electronic device 102, the third electronic device 104, or the fourth electronic device 230, which transmits the device discovery information. At least one of the second electronic device 102, the third electronic device 104, or the fourth electronic device 230 may not provide a message corresponding to the request signal, according to the discard instruction.

According to various embodiments, if the information associated with the external device 210 corresponds to the stored identification information, the processor 120 may determine the external device 210 that transmits the request signal as a device disposed in a public place. Due to a device disposed in a public place, an unnecessary message may be provided to a user. Accordingly, the processor 120 may transmit a discard instruction in order to prevent provision of an unnecessary message.

According to various embodiments, even when the information associated with the external device 210 corresponds to the stored identification information, the processor 120 may perform control to another electronic device (e.g., the second electronic device 102, the third electronic device 104, or the fourth electronic device 230) to register the external device 210 according to a request from a user (or a manager of a public place). For example, the processor 120 may initialize the setting associated with the external device 210 registered in advance (e.g., a factory default setting), and may enable the second electronic device 102, the third electronic device 104, or the fourth electronic device 230 to temporarily register the external device 210.

If the stored identification information does not correspond to the information associated with the external device 210 included in the device discovery information, the processor 120 may transmit a register instruction in operation 809. The processor 120 may transmit a register instruction to at least one of the second electronic device 102, the third electronic device 104, or the fourth electronic device 230, which transmits the device discovery information. At least one of the second electronic device 102, the third electronic device 104, or the fourth electronic device 230 that receives the register instruction may provide a message corresponding to the request signal.

According to various embodiments, if the information associated with the external device 210 does not correspond to the stored identification information, the processor 120 may determine the external device 210 that transmits the request signal as a device that is not disposed in a public place. The processor 120 may transmit a register instruction for registration of the external device 210.

An operation method of an electronic device (e.g., the electronic device 101 of FIG. 1) according to various embodiments may include: an operation of storing device information corresponding to another electronic device in a memory (e.g., the memory 130 of FIG. 1) of the electronic device; an operation of detecting an event related to registration of an external device; an operation of determining another electronic device, based on the device information; and an operation of instructing the determined other electronic device to register an external device.

The operation of detecting may include: an operation of identifying that the event is detected, if device discovery information is received from another electronic device or if a broadcasted request signal is received from the external device.

The operation of determining may include: an operation of determining a priority of the other electronic device, based on the device information; and an operation of selecting the other electronic device, based on the priority.

The operation of instruction may include: an operation of selecting the electronic device as a device with which the external device is to be registered, based on at least one of a setting of the electronic device, a user setting, or the device information; and an operation of instructing the other electronic device not to provide a message for registering the external device.

The operation of instructing may include: an operation of selecting the electronic device as a device with which the external device is to be registered, based on at least one of a setting of the electronic device, a user setting, or the device information; and an operation of instructing the other electronic device to provide a message for registering the external device.

According to various embodiments, a message for registering an external device is provided only when a broadcasted request signal and a nonaudible frequency signal are received from an external device. Accordingly, the number of unnecessarily transmitted messages may be reduced and user convenience may be improved.

According to various embodiments, an electronic device for registering an external device may be determined from among a plurality of electronic devices, and a message for registering an external device is provided to only the determined electronic device. Accordingly, messages are not incurred by the all electronic devices, and inconvenience for a user may be solved.

According to various embodiments, if an external device identifier included in a request signal corresponds to a predetermined identifier, the electronic device may be controlled to discard the request signal.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
at least one transceiver;
a memory; and
at least one processor configured to:
control the at least one transceiver to receive a request signal for registering an external device, the request signal being broadcasted by the external device,
control the at least one transceiver to receive a non-audible frequency signal, wherein an identification number is encoded in the non-audible frequency signal,
based on the identification number corresponding to the external device, identify whether the non-audible frequency signal is received from the external device,
transmit device discovery information to a server based on identifying that the non-audible frequency signal is received from the external device,
provide a display of a message for registering the external device corresponding to the request signal if the electronic device is selected by the server as a device with which the external device is to be registered,
not provide the display of the message for registering the external device corresponding to the request signal, if the electronic device is not selected by the server as a device with which the external device is to be registered,
wherein the non-audible frequency signal is a signal having a frequency outside a frequency band audible to humans,
wherein the electronic device is selected by the server, based on priorities of a plurality of electronic devices including the electronic device, as a device with which the external device to be registered, and
wherein the priorities of the plurality of electronic devices are determined by the server based on device information of the plurality of electronic devices.

2. The electronic device of claim 1, wherein the at least one processor is further configured to identify whether the non-audible frequency signal is received by the transceiver within a predetermined period of time after the request signal is received.

3. The electronic device of claim 1, wherein the priorities comprise at least one of a hub device, a device having a largest registration count, whether a voice agent is mounted, a latest registration record, or user account activation.

4. The electronic device of claim 1, wherein the electronic device is selected by the server, one or a plurality of other electronic devices, based on at least one of a setting of the electronic device, a user setting, or the device information.

5. The electronic device of claim 4, wherein if the electronic device is
selected by the server as a device with which the external device is to be registered, based on at least one of the setting of the electronic device, the user setting, or the device information,
another electronic device included in the plurality of electronic devices which is not selected by the server is not to provide the message for registering the external device.

6. The electronic device of claim 1, wherein the at least one processor is further configured to:
determine whether an identification number of the external device corresponding to the request signal matches an identification number of the external device corresponding to the non-audible frequency signal; and based on the identification numbers of the external devices matching, provide the display of the message for registering the external device.

7. The electronic device of claim 1, wherein the electronic device is selected by the server, based on a verification result of request signal, and the verification result is verified a validity of the request signal based on extracted context information from the device discovery information.

8. The electronic device of claim 7, wherein the context information comprises at least one of time information associated with a time at which the other electronic device that transmits the device discovery information receives the request signal, or location information associated with the other electronic device.

9. The electronic device of claim 8, wherein, based on a difference between a time at which the device discovery information is received and the time information included in the context information is within a predetermined period of time, the verification result is determined by the server that the request signal is valid.

10. The electronic device of claim 8, wherein, based on a difference between information associated with an external device included in the device discovery information and the location information included in the context information is within a predetermined distance, the verification result is determined by the server that the request signal is valid.

11. An operation method of an electronic device, the method comprising:

receiving a request signal for registering an external device, the request signal being broadcasted by the external device;

receiving a non-audible frequency signal, wherein an identification number is encoded in the non-audible frequency signal;

based on the identification number corresponding to the external device, identifying whether the non-audible frequency signal is received from the external device:

transmitting device discovery information to a server based on identifying that the non-audible frequency signal is received;

providing a display of a message for registering the external device corresponding to the request signal, if the electronic device is selected by the server as a device with which the external device is to be registered; and not providing the display of the message for registering the external device corresponding to the request signal, if the electronic device is not selected by the server as a device with which the external device is to be registered, wherein the non-audible frequency signal is a signal having a frequency outside a frequency band audible to humans, wherein the electronic device is selected by the server, based on priorities of a plurality of electronic devices including the electronic device, as a device with which the external device to be registered, and wherein the priorities of the plurality of electronic devices is determined by the server based on the device information of the plurality of electronic devices.

12. The method of claim 11, wherein if the electronic device is selected by the server as a device with which the external device is to be registered, based on at least one of a setting of the electronic device, a user setting, or the device information, another electronic devices included in the plurality of electronic devices which is not selected by the server is not to provide a message for registering the external device.

* * * * *